April 20, 1954
H. A. JEWETT
2,675,728
SUPPORT RESILIENCE EQUALIZER
Filed Oct. 7, 1949
10 Sheets-Sheet 1
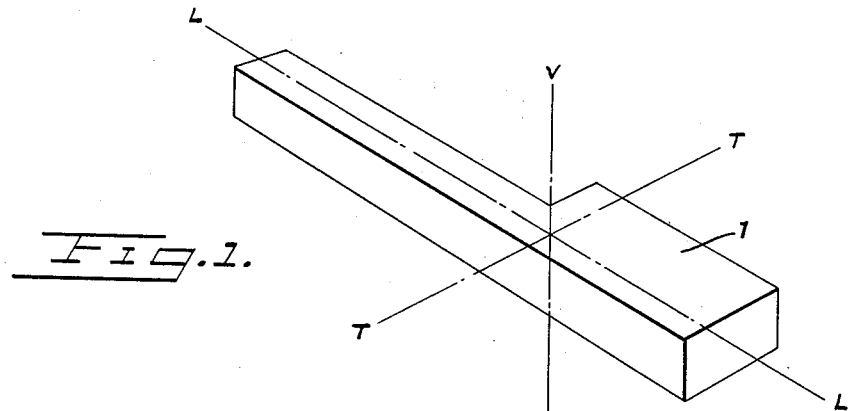
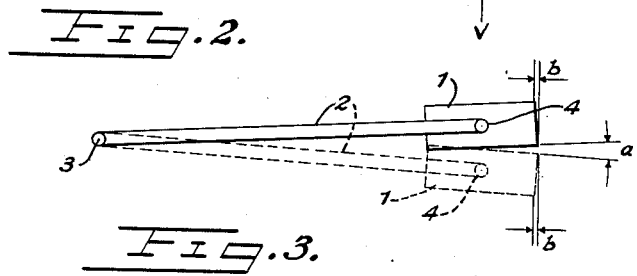
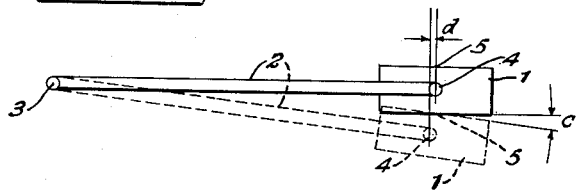
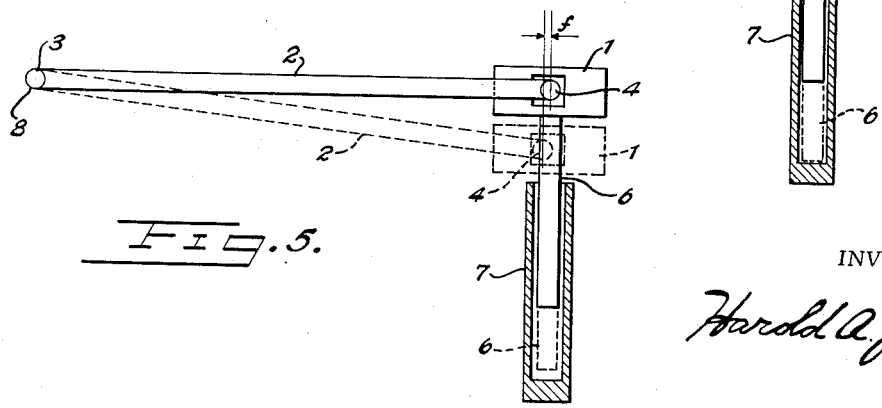
INVENTOR.
Harold A. Jewett April 20, 1954  H. A. JEWETT  2,675,728
SUPPORT RESILIENCE EQUALIZER
Filed Oct. 7, 1949  10 Sheets-Sheet 2
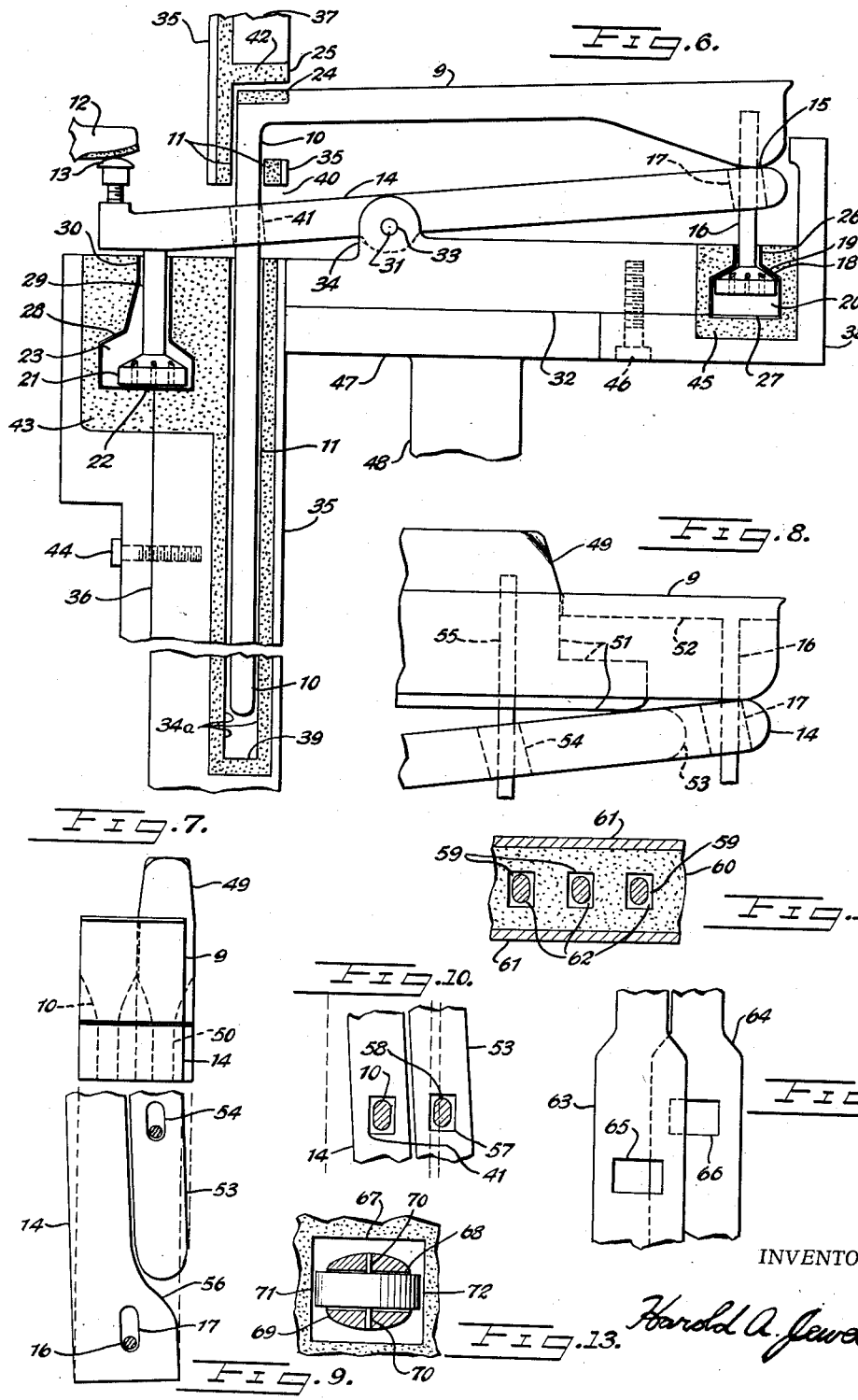
INVENTOR.
Harold A. Jewett April 20, 1954 H. A. JEWETT 2,675,728
SUPPORT RESILIENCE EQUALIZER
Filed Oct. 7, 1949 10 Sheets-Sheet 3
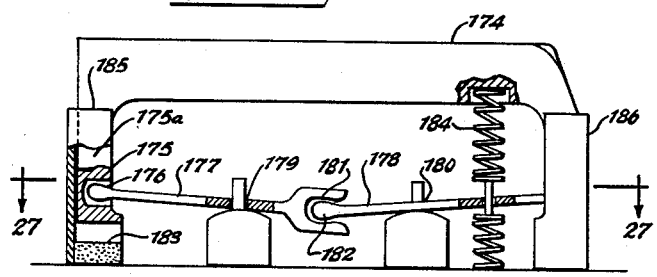
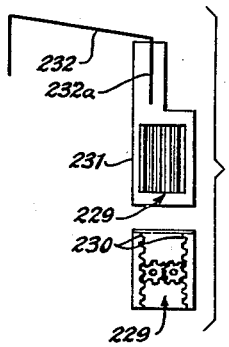
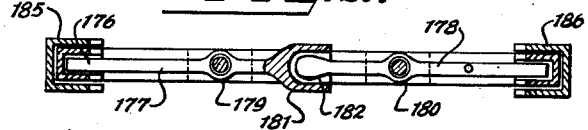
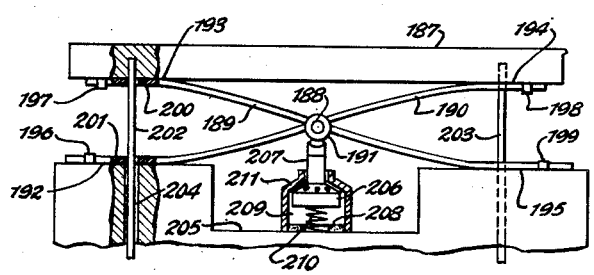
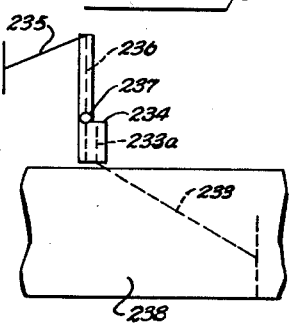
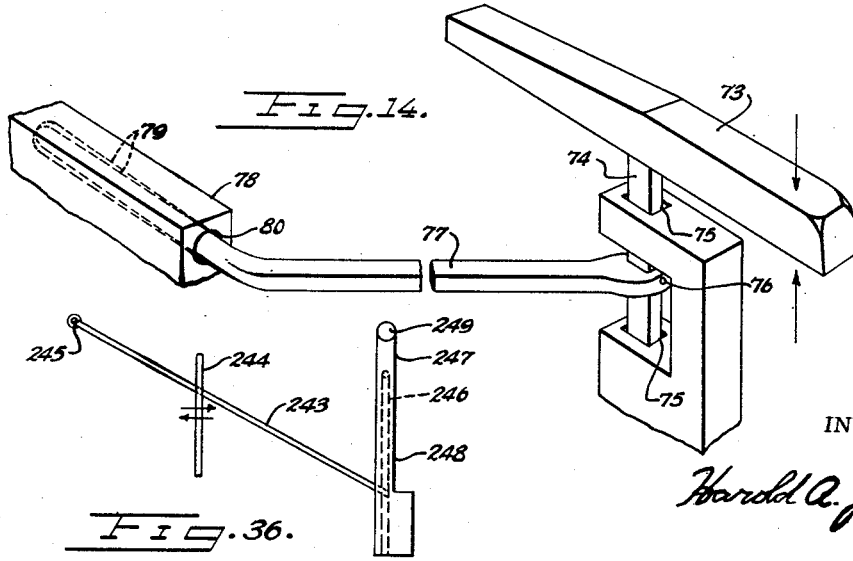
INVENTOR.
Harold A. Jewett.

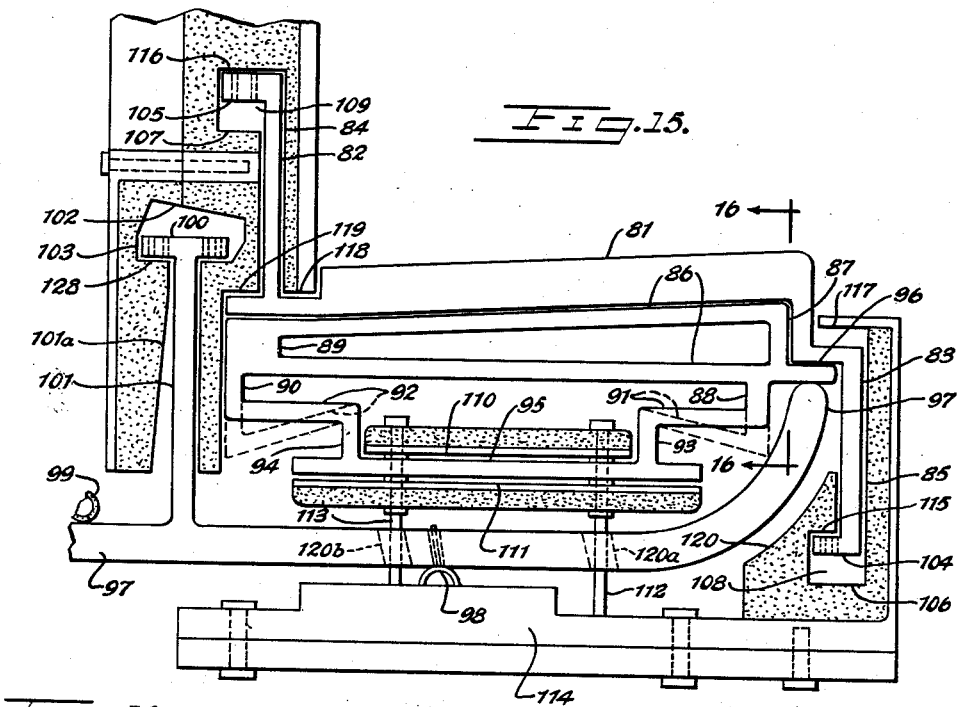
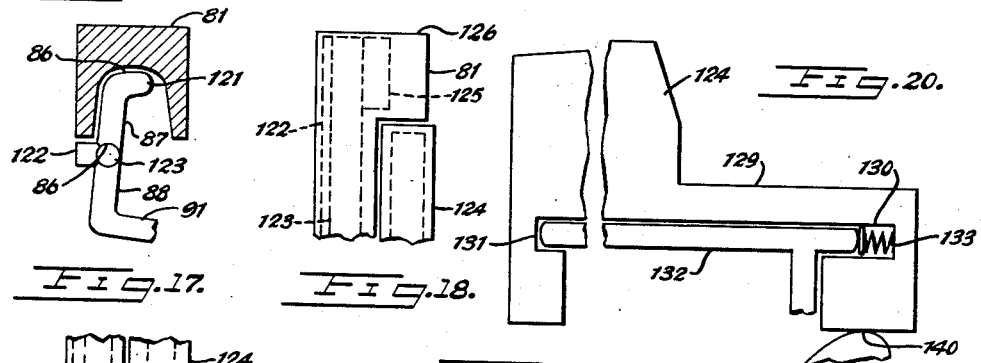
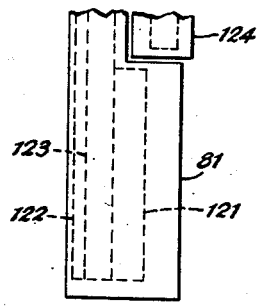
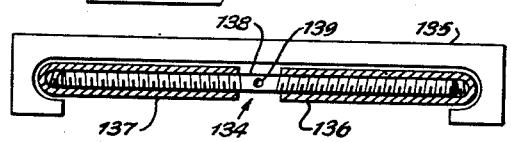
INVENTOR.
Harold A. Jewett.

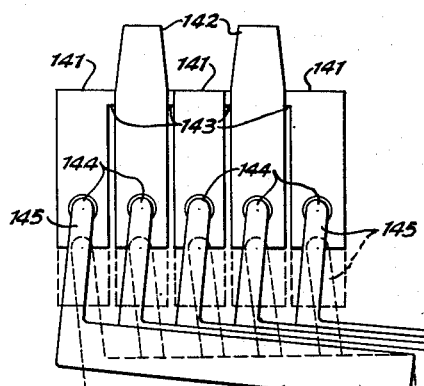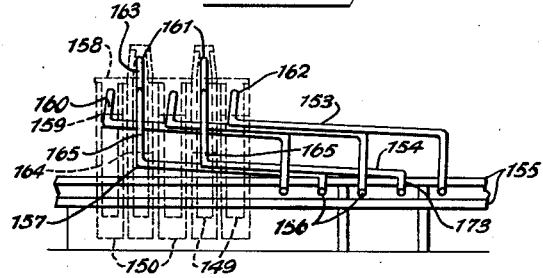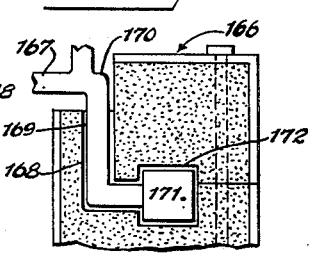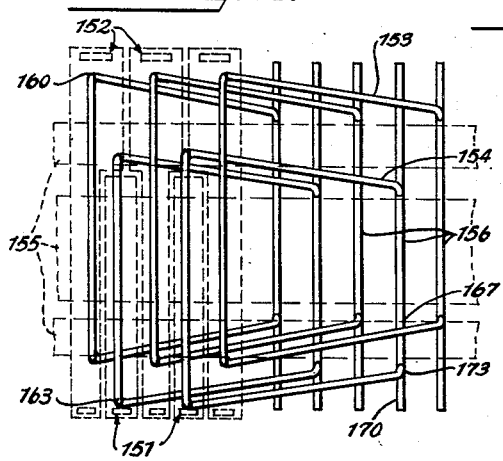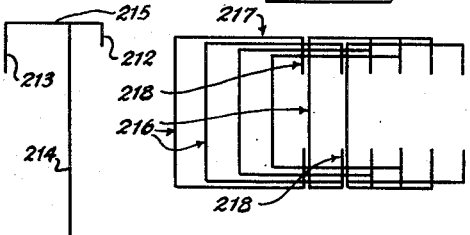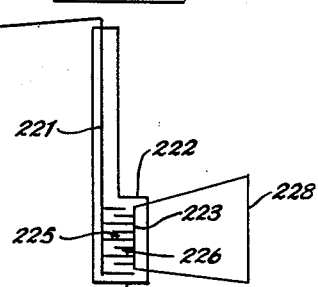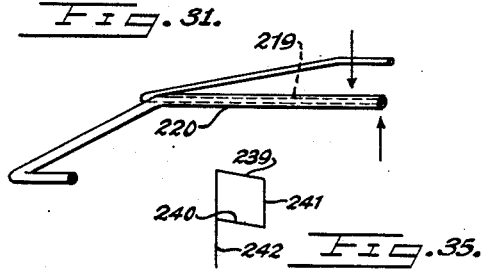
INVENTOR.
Harold A. Jewett April 20, 1954 H. A. JEWETT 2,675,728
SUPPORT RESILIENCE EQUALIZER
Filed Oct. 7, 1949 10 Sheets-Sheet 6
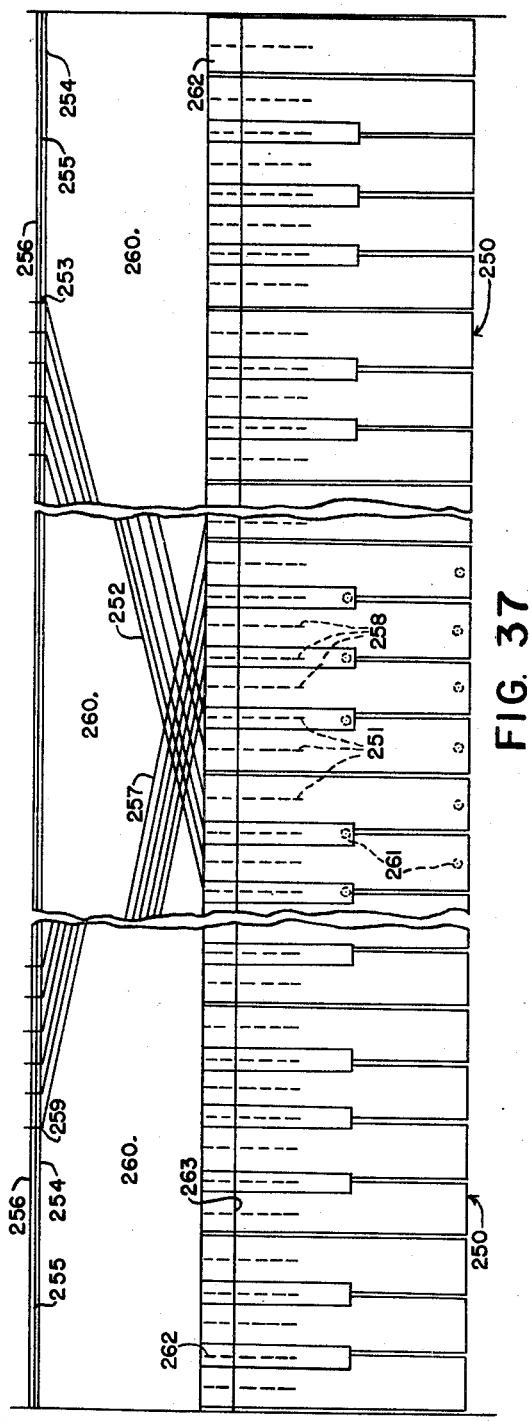
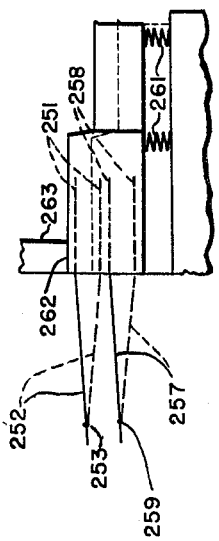
INVENTOR
Harold A. Jewett.

April 20, 1954 H. A. JEWETT 2,675,728
SUPPORT RESILIENCE EQUALIZER
Filed Oct. 7, 1949 10 Sheets-Sheet 7

INVENTOR
Harold A. Jewett.

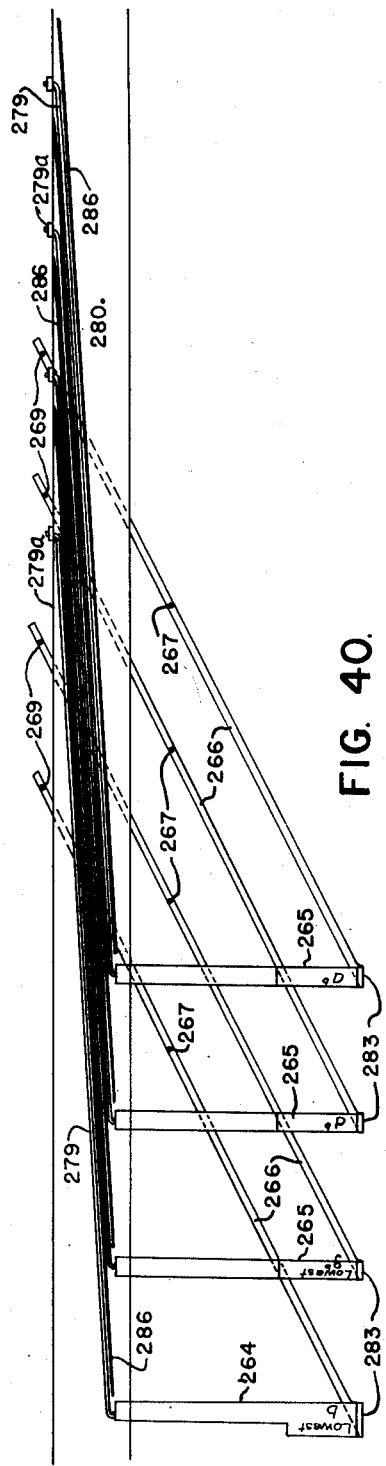
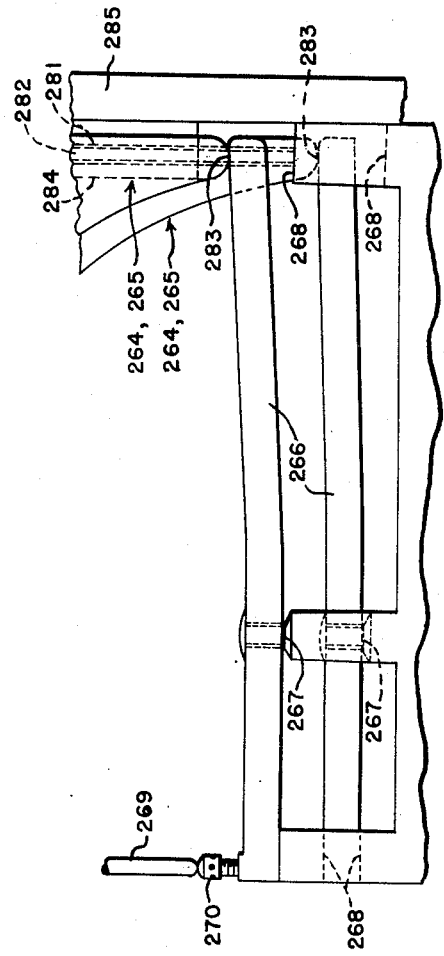

April 20, 1954

H. A. JEWETT 2,675,728

SUPPORT RESILIENCE EQUALIZER

Filed Oct. 7, 1949

INVENTOR

Harold A. Jewett.

April 20, 1954

H. A. JEWETT 2,675,728

SUPPORT RESILIENCE EQUALIZER

Filed Oct. 7, 1949

INVENTOR.

*Harold A. Jewett.*

Patented Apr. 20, 1954

2,675,728

UNITED STATES PATENT OFFICE 2,675,728

SUPPORT RESILIENCE EQUALIZER

Harold A. Jewett, Washington, D. C.

Application October 7, 1949, Serial No. 120,135

27 Claims. (Cl. 84—424)

This application is a continuation-in-part of S. N. 59,512, filed November 12, 1948.

The invention relates to keys, key actions and appurtenances thereto of keyboard musical instruments generally, more particularly pianos, organs, etc.

A general object of the invention is the provision of keys and key actions wherein the dual functions of conventional key levers—of (1) approximating uniform drop of their finger-contact or playing surface (hereinafter called the "ivory"), irrespective of the locus of finger pressure along the ivory, and (2) communicating downward motion of the ivory to tone-producer actuation means—are served by means affording novel technical advantages together with novel increase in efficiency of use of space at or near the keyboard or its supporting structure, e. g. via lessening of the front to rear dimension of the instrument and enhancement of accessibility of particular manuals to fingers of a hand playing on a neighboring one.

In conventional pianos, organs and the like (accordions too, though the utility of the invention is more especially applicable to piano and organ types of instruments) the ivory portion of a key generally is the front part of an arm of a lever, usually of the first kind, whose fulcrum lies a considerable distance to the rear of the ivory and whose rear portion constitutes or carries means, as e. g. a capstan screw, circuit closer, valve closer, or etc., for operating or communicating down motion of the ivory to tone producer actuation means. Key lever 11 in Fig. 1 of Barnett U. S. Pat. 2,472,740 illustrates the principle of this action in the case of a piano (except for the addition of the special drop equalizer mechanism for its finger-contact part 5, as an improvement thereto); and Figs. 103 and 104 on pages 317–18 of The Contemporary American Organ, 2nd edition, 1933 (or Figs. 100 and 101 on pages 305–6 of the 4th edition, 1948) by W. H. Barnes, illustrate the action in the case of organs. By reason of the distance between the fulcrum and the front of the ivory in this sort of key an approximation of uniformity of ivory drop irrespective of the locus of finger pressure along the ivory is achieved, even though by rotatory motion and even though the drop at the rear of the white (e. g.) ivories appears nevertheless to be customarily not even half that at their front.

Hammond et al. U. S. Pat. 2,253,782 and British Pat. No. 15,970 of 1901 exemplify prior art solutions other than that of the cited Barnett patent for the problem presented by this disparity of ivory drop, though they do not appear to be aimed at keys of dimensions or action weight comparable to those of ordinary full-sized piano or organ keyboards.

From the art known to applicant it appears that solutions for the problem so far have generally required use of systems involving at least a pair of levers having interlinkages making them parallel in arrangement or self-parallelizing in action (with attendant disadvantages such as the use of a multiplicity of hingelike joints) or of systems involving a pair of leaf springs so secured as to be likewise self-parallelizing in action. In either case the system as a whole is distortable in use, though the levers, as distinguished from the springs, individually are not; i. e. each reciprocation of the ivory produces a cycle of distortion in the overall shape or outline of the system as a whole.

These systems will be designated generically hereinafter as distortable or distorting systems of self-parallelizing links, or of equalizer links disposed or acting in substantially parallel arrangement.

It is an object of the invention to provide means for accomplishing the parallel, rectilinear or translatory motion (or component of motion) essential to solution of the above problem without need for resort to such systems.

It also is an object of the invention to control the ivory drop (the word "ivory" being intended to include pedal, in pedal keyboards; and manual terminology ("finger" pressure, e. g.) being intended to have reference to pedal as well as manual keys, where applicable) without need for imparting to any portion of the ivory rotatory motion relative to an axis transverse to the direction of its longitudinal axis.

It is a further object of the invention to minimize sticking of manual keys, and noisiness of both manual and pedal key actions, particularly in their key return phase.

It is a still further object to make possible a minimization of the amount and/or depth or complexity of the key action mechanism located under or to the rear of the manual.

Additionally, it is an object of the invention to provide for its application without necessity for essential or substantial modification of present designs of hammer actions or other tone producer mechanisms, save, e. g., for bringing the loci of their key contacting portions substantially farther forward than heretofore.

Other objects will appear hereinbelow.

The accomplishment of the foregoing objects, insofar as substantial equality or control of ivory drop along a longitudinal axis (i. e. about a transverse axis) is concerned, is effected by means involving the use of a rigid, ivory-driven part having a pivot contact portion advantageously located at a point less than about the ivory's length from a line (used in the sense of boundary line, i. e. its vertical plane) in which an end edge of the ivory lies, which pivot contact portion oscillates or shifts back and forth, due to reciprocation of the ivory in use, in a manner or path determined by guide means which it traverses during its oscillation, the motion of said portion being converted, whether by further means or merely by the deformation-resistant strength of said part itself (e. g. if it itself carries the ivory) into ivory motion substantially similar and equal to that at the point of finger pressure but at a point removed therefrom longitudinally along the ivory; all without resort to use of the aforesaid distortable systems.

Even if, as mentioned hereinbelow, slight bending or torsion of parts is permitted, to the extent of allowing minor deviation from the vertical in the drop of a portion of the ivory or its carrying structure, that alone will not preclude practice of the invention, since the quality of rotatoriness or arcuateness about a stationary rearwardly located fulcrum which characterizes conventional key lever actions is absent, also since there always is at least some portion of the ivory or its reciprocating carrying structure whose drop normally is substantially exactly in a vertical plane transverse to the longitudinal axis (cf. e. g. the drop of stems 10 in Fig. 6 and 90 in Fig. 15). This latter characteristic never obtains in the arc-of-a-circle course that characterizes the reciprocation of each moving point in said conventional key levers as they teeter or seesaw about their non-moving fulcrums.

Said shifting pivot contact inevitably entails a small degree of friction (imperceptible to the player, however); but the invention contemplates that with suitable choice of inherently anti-friction materials (e. g. nylon: cf. U. S. Pat. 2,246,086 and the Du Pont Magazine for January-February, 1949, page 25) the mechanical life of the key will nevertheless be endless or approximately so, as a practical matter.

The translational nature of the ivory drop produced in the preferred forms of the invention inherently facilitates closer clearance and improved precision in the working of such parts as vertical guide pins in their sleeves (corresponding, e. g., to the functioning of the "center" or "balance" pins and "front" pins of conventional keys) due to absence or lessening of arcuateness of the course of the ivory during its reciprocation. And minimization of sticking and noisiness, in the use of such pins and guides and/or other action parts in the invention, is served not only by said translational course of ivory drop but also by (1) the use of a relatively thin, wear-resistant surfacing (e. g. of nylon) for friction or impinged-upon parts, backed or supported by relatively thick (though substantially non-condensing in prolonged use) strata of sound-absorbent material, advantageously embodied in (2) sound traps, i. e. enclosures for minimizing escape of sound.

In the drawings (in respect to which suitable key return means and electrical installations are to be understood as provided in conventional ways, wherever applicable; ivories, keys, and flexing or moving-contact surfaces and parts as being optionally subject to modification to give them or enhance their individual replaceability; vibratory or oscillatable lever, spring or other moving parts as provided, when needed, with suitable stop, anti-backlash, damper, or sound-absorbing means; all parts as being given fitting anchorages and housings; all figures as being basically diagrammatic or schematic; and all expressions such as vertical, horizontal, downward, upward, lateral, longitudinal, etc., as being relative and approximate unless otherwise evident), to be more particularly described later on:

Figs. 1–5 are diagrams delineating the basic problem of arcuateness dealt with by the invention, and the underlying principle applied to its solution;

Fig. 6 is a side elevation of a key embodying said principle and corresponding to the key of Fig. 52 of the parent case, but also embodying certain innovations;

Figs. 7–11 are details of the key of Fig. 6;

Figs. 12–13 are optional variations of certain of said details;

Fig. 14 is a perspective of a key embodying said principle;

Fig. 15 is a side elevation of a key embodying the basic principle of that of Fig. 14, along with certain variations and innovations;

Figs. 16–19 are details of the key of Fig. 15;

Figs. 20 and 21 are further, mutually alternative, details applicable to keys such as that of Fig. 15;

Figs. 22 and 23 are rear view diagrams illustrating alternative arrangements of Fig. 15 types of keys into gangs;

Fig. 24 is a plan diagram of the arrangement shown in Fig. 23;

Fig. 25 is a detail applicable to the keys of Figs. 14–24;

Fig. 26 is a side elevation with portions cut away of a further form of the key of the invention;

Fig. 27 is a section on the line 27—27 of Fig. 26;

Fig. 28 is a side elevation with portions cut away of a still further form of the key of the invention;

Figs. 29–36 are schematic illustrations of additional variations of key forms exemplifying the wide choice available within the invention:

Figs. 37–49 are replicas of certain figures (or portions of them) of the parent case wherein:

Figure 39:
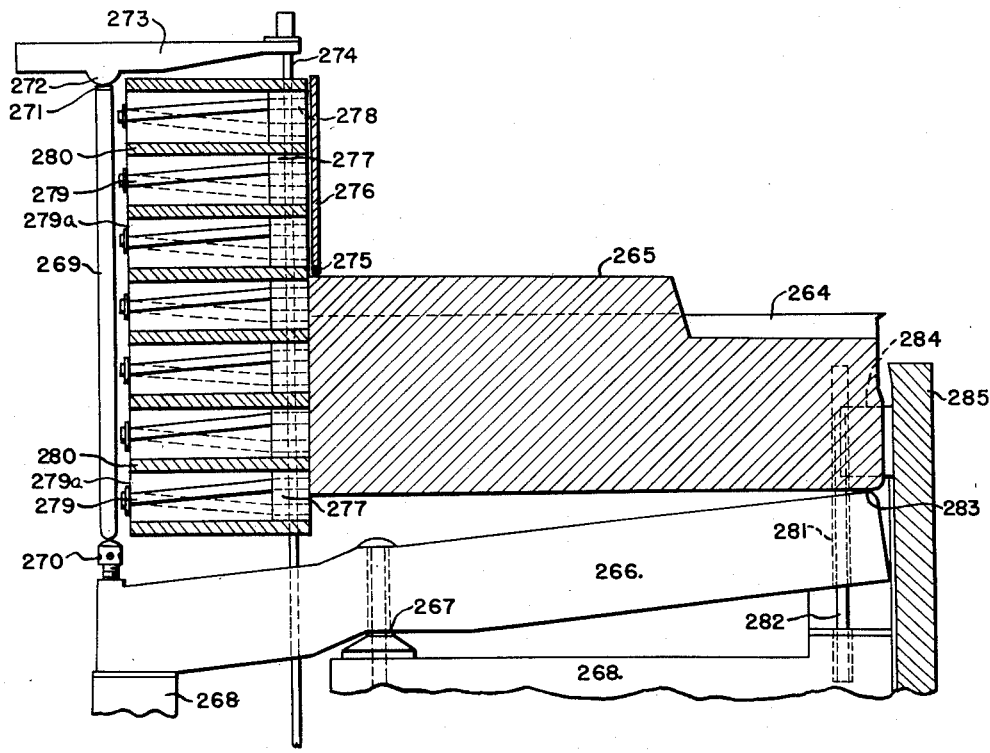

Figs. 37–38 exemplify use of the basic principle of the crank action key of Fig. 14 in a bench of spring-returned keys;

Figs. 39–41 exemplify use of the same principle in a bench of hammer action-returned keys; and Figs. 42–49 variously illustrate applicability of the basic principle of the guide stem or "sliding cane" action key of Fig. 6 to not only keyboard musical instrument keys but also to resilient supports generally.

Referring to Figs. 1–5:

In Fig. 1, which exemplifies an ivory 1 of the least symmetrical sort, lines V—V, L—L and T—T passing through the center of gravity respectively represent vertical, longitudinal and transverse axes about which (or about axes respectively parallel to which: said symbols being intended hereinafter to be inclusive of the latter) rotatory motion of the key will occur if pressure is applied to either side of them.

In conventional instruments rotatory movement about a V-axis is precluded by the joint functioning of the "balance" pin and the "front" pin; said pins also playing a part in insuring against rotatory or tilting motion about an L-axis. But rotatory or tilting motion about a T-axis is generally not prevented, but merely reduced to a point of toleration by disposing the fulcrum through which it runs well to the rear of the ivory.

In Figs. 37-41, described below, wherein the principle of a crank is invoked to provide an ivory-drop equalizer that can be disposed more or less lengthwise of the manual in place of extending about 1½ to 2 ivory lengths to its rear, the mere length of the shank is likewise relied on to reduce to a negligible amount the effect of the consequent arcuateness of ivory drop.

At this point it may be remarked that although an ivory drop of ⅜" at the front of a white ivory is understood to be generally standard, the area of most frequent finger-contacting lies farther back, i. e. near the line of the black ivory fronts, and that since the drop there is less, the standard of drop contemplated by this application in the case of the white ivories, will be reduced accordingly, i. e. to about $\tfrac{5}{16}$".

In Fig. 2, which is a front elevational diagram, the shank 2 of a "crank" pivoted at fulcrum 3 carries rigidly secured to its "handle" 4 the ivory 1, the axis of the handle 4 being ½ said ivory drop distance, i. e. $\tfrac{5}{32}$", above horizontal in the "up" position and a like distance below horizontal in the "down" or dash-line position. This divides the angle of ivory tilt, $a$, into one-half above horizontal and one-half below, besides dividing the lateral component of ivory motion, $b$, into one-half away from fulcrum 3 and one-half toward it.

In Fig. 3 the situation is the same except that the divisions of tilt and lateral component are effected by starting with the mid-point 5 of the ivory's finger-contact surface, rather than the axis of the handle 4, half an ivory drop above horizontal, thus yielding a tilt angle of $c$ and a lateral component of $d$.

It seems apparent that in the action of any pivotally mounted key the factors $a$ or $c$ or a mixture of them, and $b$ or $d$ or a mixture of them, will inevitably be involved, to at least a slight extent, unless considerable distortion in action is permitted or appropriate slippage of parts provided for.

In Fig. 4, wherein the ivory 1 not only is given rotative freeness at its "handle" 4 but also is provided with a rigidly affixed downwardly depending guide stem 6 that, during downward and upward swinging of the shank 2 is held to a vertical course by sleeve guide 7, distortion is obviated by permitting slip through the distance $e$ of anchor 8 (which coincides with the fulcrum 3).

On the other hand, in Fig. 5, wherein the anchor 8 is held stationary while not only rotative freeness but lateral play as well is permitted at the "handle" 4 (the situation being otherwise the same as in Fig. 4), distortion is obviated by permitting slip through the distance $f$.

This principle of slippage (or shifting of a point of pivot contact) exemplified in Figs. 4-5 is involved in one form or another in all the expedients shown herein for preventing tilt about a T-axis, in other words for controlling or insuring equality of drop of the L-axis.

It will be noted that an analogous slip (though under heavier friction) occurs between the capstan screw and the first lever of the hammer action of pianos generally, though not as an agency for producing equality of L-axis drop; also, that the slip which occurs between balance and front pins and guide sleeves for them in conventional key actions contributes, not to prevention of tilt about a T-axis, but only to prevention of tilt about an L-axis and/or of rotative play about the V-axis. Moreover, in neither of such instances has use been made, so far as applicant is aware, of materials (e. g. nylon) believed to be far superior to those customarily used, for conveniently withstanding the friction involved and minimizing or eliminating entirely the occasion for lubrication, replacement and/or other servicing.

In Fig. 6 the shifting pivot contact principle is applied by means of a sliding "cane" type of equalizer, as distinguished from a crank-like one. That is, ivory 9 (shown as sloping slightly at a conventional angle) has at its rear a rigidly affixed downwardly depending stem 10 which advantageously is longer than the ivory, preferably 1½ to 2 or more times its length, and which reciprocates in a vertical guide 11 (cf. also Fig. 11) which may, e. g., be disposed in the bottom panel of a conventional piano casing. When not in use the ivory-plus-stem structure is held in "up" position by the weight of a hammer action (understood) transmitted through part 12 to capstan screw 13 of lever 14, the latter bearing up under the front of the ivory at 15. Securely depending from the front of the ivory is another stem-like member 16 which passes through a slot 17 in lever 14 and carries a skirt 18 which limits upward motion of the ivory by impinging against shoulder 19 of sound trap 20. Supplementing this action of skirt 18 is that of an analogous skirt 21 seating on the bottom 22 of trap 23; also, if desired, the action of cushion 24 impinging against cushion 25 at the rear of the ivory.

Application of down force at any point along the ivory produces substantially rectilinear drop of its L-axis due to the confining action of the guide 11 on long stem 10; while tilt about the L-axis is precluded not only by the lateral walls of that guide (understood) but also by the lateral walls of slot 17 (cf. Fig. 7) and those (understood) of collar 26, which confine stem 16 against side-to-side motion. And at an ivory drop's distance below the up position the downward course of ivory and stems is limited by seating of skirt 18 on bottom 27 of sound trap 20, as well as by impingement of skirt 21 against shoulder 28 of rear sound trap 23.

Alinement of lever 14 is maintained by confinement of lever stem 29 by the side walls (understood) of collar 30 of sound trap 23 and affixation of the lever at pivot 31 to understructure 32, as by axle 33 journaled in hub-like part 34, supplemented, if desired, by a forwardly located front pin (not shown) rising upwardly from 32 through a guide slot (not shown) in the lever.

Wherever any action noise may be generated sound absorbent material or structure (signified by dots in the drawing) may be used, advantageously with a wear-resistant facing of nylon or the like at points of impingement of part against part, e. g. at 11, 22, 24, 25, 27 and/or 34-$a$. Backing for the sound-absorbent material may be supplied by re-inforcement laminae such as indicated at 35, 36, 37 and 38.

Close clearance between stems and collars at 11 (top), 26 and 30, as well as closure of guide 11 at its lower end 39 further aids in bottling up any sound arising from the key or lever action. This is particularly desirable during and at the end of the key return phase, when a drowning-out effect from the instrument's tone itself may not be present (as it is at the instant of the end of the down phase of a key action).

An aperture 40 in guide 11 makes way for the lever 14 (all portions of this guide structure and other such parts being securely carried by supporting frame or casing structure, understood where not shown) while a slot 41 in the lever permits stem 10 to reciprocate through it.

All parts may readily be assembled or disassembled; e. g. top rear frame structure 42 can be lifted from its support (understood), lower rear frame structure 43 removed after unfastening of bolt 44, front frame understructure 45 removed after unfastening of bolt 46, stem 16 removed (as by unscrewing) from ivory 9, and the latter with its stem 10 then lifted out. Next, lever 14 with its individual understructure 32 can be lifted from support 47 which in turn in held up by leg 48.

Fig. 7 is a front elevational detail of the top portion of the ivory 9 and lever 14 of Fig. 6, with front frame structure removed and an adjacent black ivory 49 indicated, down stems 10 and 50 of the respective ivories being depicted by dash lines.

Fig. 8 is a side elevational detail of the front portions of the ivories of Fig. 7, but with a forwardly extending understructure 51 of black ivory 49 shown as disposed low enough not to be contacted by down motion of an under face 52 of the portion of white ivory 9 overlying it; said understructure 51 contacting lever 53 which has a slot 54 for the black ivory's front stem 55 to reciprocate through, the action of lever 53 and stem 55 being analogous to that of lever 14 and stem 16, above described.

Fig. 9 is a plan view detail of the front portions of the levers 14 and 53 juxtaposed as in Fig. 8. Dash lines indicate the front-to-rear direction of the ivories (themselves not shown), with the alinement of the levers indicated as optionally at an angle therewith. Necking in of lever 14 at 56 makes room for lever 53 as shown.

Fig. 10 is a cross-sectional detail illustrating slots or apertures 41 (cf. Fig. 6) and 57 in the rears of levers 14 and 53 (cf. Fig. 9) for stems 10 (cf. Fig. 6) and 58 to reciprocate through.

Fig. 11 is a cross-sectional detail of a gang of guide sleeves 59 such as 11 (cf. Fig. 6) constituted by vertical openings in wall structure 60 composed of a sound-absorbent medium (indicated by dots) and reinforcement laminae indicated by 61. Stems 62 such as 10 (cf. Fig. 6) may be spaced as shown.

Fig. 12 is a plan view detail of rear portions of a pair of adjacent levers 63 and 64, respectively like 14 and 53 of Figs. 8–10 except double-tiered after the manner developed in the parent case, i. e. with one overlapping the other. This makes extra size available for apertures 65 and 66 to accommodate stems larger than otherwise (which stems may be made hollow or of light weight material if desired).

Fig. 13 is a cross-section of a sleeve structure 67 correspondingly enlarged, with stem 68 carrying an anti-friction roller 69 journaled in it at 70 so as, if desired, to provide close-clearance rolling friction at front and rear walls 71 and 72 of the sleeve in place of rubbing friction, if desired. Such rollers (or a plurality of them, e. g. one in continual contact with the front sleeve wall and another in continual contact with the rear sleeve wall) may be disposed e. g. at points on the lower and upper portions of stem 68, where the principal contacting with the sleeve walls occurs during use. Illustrative design details appropriate for such roller installation may be found, e. g., in parts 4—8 of U. S. Pat. 2,198,720 or parts 16—17 etc. of U. S. Pat. 712,488. Or, alternatively, the rollers can be installed at rub points in the sleeve walls, instead of being carried by the stem. Use of such rollers may be found particularly desirable in furniture embodiments of the invention such as hereinafter described.

Of course, when sleeve 11 and stem 10 of Fig. 6 are disposed upwardly rather than downwardly, or sufficiently so that they are entirely above the lever 14, no occasion is presented for providing apertures such as 65, 66, 41 and 40.

Fig. 14 shows an ivory 73 rigidly carried by stem or neck 74 which is held to a vertical course by guide 75. Rotative freeness at joint 76 permits this notwithstanding the slight arcuateness of motion of the crank-like equalizer 77 during its reciprocation about the pivot member 78 in which its anchor portion 79 is confined.

One form of the shifting pivot contact of the invention is exemplified in the rotative motion of 79 in relation to the confining walls of its sleeve 80.

Only the length of the shank of 77 (upwards, say, of about four inches) is here relied on to counter excessiveness of horizontal component of motion such as that shown by b and d in Figs. 2 and 3; though ivory tilting in the manner shown by a and c in those figures is (optionally) prevented by the rotative freeness at joint 76.

Equality of drop of the L-axis of the ivory is secured by the rigidity of the stem-to-ivory connection and the absence of rotative freeness relative to a T-axis, at 76, plus the confinement of 79 in 78 and the inherent torsion-resistance of the material (e. g. spring steel or other non-ductile, tough alloy) of the shank of the equalizer 77.

In Fig. 14 (or Fig. 6 as well) the ivory or its immediate supporting structure can be integral with the "handle" of the stem or rigidly affixed thereto.

The higher arrow in Fig. 14 signifies the approximate point of most frequent finger pressure in use, while the lower arrow signifies the optional locating directly under it of the "load," i. e. of the key return force, whether it be a lever transmitting the weight of a piano hammer action or a spring in an organ, or etc.

Greater economy in cross-section of the shank of the equalizer 77 is possible (and therefore greater length consistent with successive placement of gangs of shanks of adequate strength within the limited space available in the ordinary keyboard) by locating the shank-to-handle connection toward the rear of the ivory while preserving the location of the load at its front.

In Fig. 15 the same principles of the "crank" and of rotative freeness about an L-axis as in Fig. 14 are used, but the shank length is very much shortened with substantially complete elimination of horizontal components of motion such as b and d of Figs. 2–3 nevertheless accomplished. In the drawing ivory 81 is shown as carrying rear guide stem 82 and front guide stem 83, which protect it both against rotation about its V-axis and tilt about its L-axis, through the medium of lateral walls (understood) of sleeves 84 and 85. On depression of the ivory translational down motion is imparted to handle 86 of the equalizer, other parts of which include front and rear vertical stem portions 87, 88, 89 and 90, front and rear shanks 91 and 92 (similar, e. g., to below identified parts 153 in Figs. 23–24 and individually analogous to the shank of equalizer 77 in Fig. 14) front and rear down stems 93 and 94, and anchor 95; all such equalizer parts being integral or inter-united to constitute a rigid, deformation-resistant unit. Said down motion is transmitted through lip 96 to lever 97 (unless e. g. to a return spring if in an organ action) which rocks about fulcrum 98 to impart motion to the first member 99 of a hammer action (not shown), which member conveniently may take the form and function, say, of part 42 in U. S. Pat. 2,338,992, such lever motion being stopped by seating of skirt 100 carried by rear lever stem 101 against ceiling 102 of sound trap 103.

Concomitantly skirts 104 and 105 directly limit ivory down motion by seating against floors 106 and 107 of their respective sound traps 108 and 109.

During the down action shanks 91 and 92 move to their dash line positions, their anchor meanwhile sliding or shifting, after the manner indicated by dash lines at 147 in below described Fig. 22, within the horizontal sleeve guide consisting of roof member 110 and floor member 111, the latter two members being secured in close clearance relationship to anchor 95 by columns or pins 112 and 113 rising from base member 114, and/or by fixation means (not shown) located e. g. at the ends of the keyboard.

On release of finger pressure the movements of the parts automatically reverse, the weight of the hammer action serving to rock lever 97 to lift the equalizer upwardly via pressure on the underside of lip 96, translational character of equalizer up motion under the ivory being compelled by the anchor's sleeve guide and the rigidity of the equalizer, the ivory 81 being thereby lifted translationally until stopped by seating of skirts 104 and 105 on ceilings 115 and 116 respectively of sound traps 108 and 109.

No contacting with moving parts is necessary at surfaces 117, 118, 119 and 120, although to use 118 and 119 e. g. as ivory upstops and 120 as the key lever down stop, or analogous surfaces (not shown) at the rear of the lever as up and/or down motion stops, all in lieu of the sound trap stop means of the invention, would merely be in accord with prior art principles.

Alinement of the lever 97 is maintained by lateral walls( understood) of sleeve 101–a in conjunction with one or more vertical guide pins forwardly thereof, as, or disposed as, pins 112 and 113 rising through lever slots 120–a and 120–b.

Functioning of certain of the unnumbered parts on Fig. 15 will be apparent in view of the description of analogous parts of Fig. 6 above, and that of others will become apparent hereinbelow.

Fig. 16 is a front elevation on the line 16—16 of Fig. 15 showing ivory 81, equalizer handle 86, stems 87 and 88, and shank 91. Horizontal ledges 121 and 122 are optionally added to provide width of seating for the under side of the ivory on the handle of the equalizer. Even in the case of the most unsymmetrical ivories however (Fig. 16 representing such) not only 121 and 122 but all handle structure above 88 other than part 123 (which represents handle 86 of Fig. 15 with its stems 89 and 87 and the portion connecting them omitted) could be dispensed with, and the off-centering of 123 (which off-centering permits uniform spacing of rear stems 90 (Fig. 15) after the manner of stems 145 in Fig. 22) rendered inconsequential solely by the functioning of ivory stems 82 and 83 (Fig. 15) in their guide sleeves 84 and 85, or of stems and guides of the type of 149, 150 in Fig. 23 to preclude tilt about the L-axis of the ivory.

When handle 86 is forced down by depression of the ivory, shank 91 is forced, due to the vertical course forced on said ivory stems, to swing laterally in a path determined by anchor guide surfaces 110 and 111 (Fig. 15) between which its anchor 95 is confined, appropriate stop means being advantageously provided to limit any continuance of such swing (due to momentum) at the end of ivory down motion. And during the key return action the reverse occurs, by reason of the upward pressure of the lever on the lip 96 (Fig. 15).

Advantageously the parts are so disposed and proportioned that the amplitude of swing is just small enough to preclude any contacting of stem 87 with either inner side of the ivory.

Fig. 17 shows the ledges 121 and 122 in the front portion of the ivory 81 of Fig. 16, 121 not continuing rearwardly of the front of adjacent black ivory 124 however.

Fig. 18 shows part 123 continuing, coincidently with the L-axis, to the rear of ivory 81, as well as ledge 122 similarly continuing alongside it; also a rear counterpart 125 of ledge 121, furnishing central support for widened rear extension 126 of ivory 81.

Fig. 19 is a plan view detail of skirt 100 of rear stem 101 (Fig. 15), and shows the optional location of air ducts 127 in positions such that, on seating of the skirt 100 on the shoulder 128 of sound trap 103, their lower ends will be sealed against escape of air-borne sound waves. This principle may of course be applied to the air ducts (unnumbered) in the other sound traps shown in the drawings.

Fig. 20 is a side elevation of black key 124 (Figs. 17–18), showing a front underextension 129 disposed at a low enough level not to interfere with down motion of adjacent white ivory fronts. In the body of the key (thus extended) are recesses 130 and 131 for receiving a handle 132 insertable (when held at appropriate angle) by depression of spring 133, and during use held fast by it.

Fig. 21 is an elevational detail of an alternative means for securing an equalizer handle 134 in an ivory 135, said means comprising front and rear internally reversely screw threaded handle parts 136 and 137 held together by right- and left-screw link 138. In least extended form the composite handle structure is short enough to be inserted loosely into position, whereupon turning of the link extends the overall length until a snug fit is achieved. Suitable cotter or key means (not shown) may then be inserted through hole 139 to bear against the underside of the ivory so as to lock the link against unscrewing.

It will be noted that when the devices of Fig. 20 or Fig. 21 are used, ivory down motion is transmitted immediately to lever 140 (Fig. 20) rather than through a lip such as 96 (contacting lever 97) in Fig. 15, also that in assembling gangs of ivories over gangs of levers here, as well as in other analogous embodiments of the invention, inherent selectability of pitch is presented, through choice of which ivories to place over which levers. Utility for mechanical transposition thus is manifest, though such utility is not per se being made a subject of claim limitation in this application.

Fig. 22 is a rear elevational diagram of a gang of white keys 141 and black keys 142 in conventional arrangement, except that the front portions 143 of the white ivories are made thin, and considerable vertical dimension is indicated to give ample size to a forward underextension (not shown) of the black ivories (as in the case of 129 in Fig. 20) and yet have it low enough not to interfere with down motion of said thin front portions 143 of adjacent white ivories. Supporting equalizer handles 144, disposed axially of the ivories in rotatively free contact with channels (understood) through them, emerge as shown, and then stem down as at 145. The equalizer shanks 146 (analogous to shanks 92 of Fig. 15 except for being optionally shown as diverging rearwardly from the rear line of the keys rather than forwardly of it) are shown as having more thickness vertically than horizontally, to illustrate enhancing of strength without crowding, through increase of the vertical dimension. The down stems 145 are given ample length so that when one ivory is depressed (cf. dash lines) its under side will not bear down on the top of the shank of an adjacent undepressed ivory, in case the particular design permits any portion of such shank to underlie such ivory (as it does, e. g., in the case of shanks 91, 92 of Fig. 15).

When ivory down motion is stopped by independent means (not shown) anchors 147 have reached their dash line positions and any further movement of them (if occasioned by momentum) is limited by partitions 148; reverse limiting effect being similarly provided following ivory up motion.

Figs 23-24, wherein ivory parts and anti-L-axis tilt guide structures are indicated by dash lines, and equalizer structure such as that of Fig. 15, in solid lines, illustrate the use of downwardly depending stems 149 working in sleeve guides 150 (Fig. 23) at locations such as indicated at 151 and 152 (Fig. 24) to prevent rotative movement about V- and L-axes. And placing of white key shanks 153 well above black key shanks 154 (Fig. 23), besides arranging the differential horizontal disposition of the two sets as shown in Fig. 24, permits greater horizontal thickness of shanks than in the case of Fig. 22. Horizontal sleeve guide structure 155 (cf. Fig. 24) for the anchors 156 is so distributed as not to be in the way of black ivory shank elbows 157 (Fig. 23) in their down motion. Similarly ivory understructure, such as beneath thin top portions 158 (Fig. 23), is cut away and/or otherwise proportioned to prevent its contacting equalizer parts of adjacent keys during use, and the under side 159 of the white ivories is disposed high enough so that, in conjunction with the use of up-stems or neck 160, all white ivory and equalizer parts lying directly above black equalizer parts clear them in action.

Ivory-to-handle contacting at 161 and 162 is as in Fig. 16, except that upwardly disposed structure such as 163 of the black handles is omitted from the white ivory-to-handle contacting structure at 162.

Contacting of black shanks 154 by down motion of adjacent black ivory and handle parts is precluded by having the under side 164 of the black ivories sufficiently cut away under the ends and/or otherwise high enough, and the up stems or neck 165 long enough, to insure the necessary clearance.

Optionally guard fins (not shown), e. g. rising from the understructure to project between and be disposed parallel to successive shanks, can be provided.

In Fig. 25, which illustrates the use of a sound trap 166 for an anchor 167 working in a sleeve 168, part 169 may be considered as formed, e. g., by downward elbowing of a terminal portion 170 of the anchor 167 of Fig. 24. During the slight to-and-fro oscillations which the equalizer undergoes its weight is then carried by part 171, which may merely be an enlarged anti-friction surfaced part or signify anti-friction roller (or ball) bearing means. Minimizing of escape of sound is aided by closeness of clearances, and motion-limiting partitions (not shown) analogous to 148 of Fig. 22, to act as stops for 171 are understood.

Of course the embodiment of Fig. 25 contemplates a similar structure at the other end of the anchor 167 with both structures rigidly interunited thereby, as well as the optional dispensing with any contacting of 167 by guide structure save in recesses 172 inside the pair of sound traps. Also, location of the part 169 may be directly beneath anchor stem or neck 173 (cf. Fig. 23), or otherwise varied. In addition, recesses 172 for successive equalizers may be placed alternately lower down and/or farther out (other parts being proportioned accordingly) to make use of the principle of staggering (analogously, in a broad sense, to its use in Fig. 12) to permit enlargement of parts.

In considering the action not only of the instant sort of equalizer but also of the others of the invention, it should be borne in mind that the friction force involved is not at all that of the full weight of the finger pressure or return load on the key, since that force is absorbed mainly by the ivory and lever down-stop and up-stop means; but rather is merely that fraction of such force which is required to urge the ivory from an arcuate into a rectilinear course during its reciprocation.

In Figs. 26-27 down pressure at any point along the ivory 174 imparts translational motion to it via a shifting pivot or scraping contact between socket 175 of its downward extension 175-a and the ball-like terminal 176 of lever 177, a like action simultaneously occurring at the unbroken-away end of the key. Irrespective of which end of the ivory receives the greater component of down pressure the levers 177 and 178 must undergo equal rocking about their fulcrums 179 and 180 due to the ball-and-socket-like relationship between socket 181 and ball-like terminal 182 of lever 178.

Down motion of the ivory is stopped, e. g. by nylon-surfaced sound absorbent body 183; while on interruption of down pressure the load, typified by spring 184, lifts the ivory upward until it is again stopped by means (not shown) which may be, e. g., parts such as 24, 25 of Fig. 6, at the rear of the ivory, and/or 104, 115, 105, 116 of Fig. 15 at either its front or its rear.

The up motion of the ivory is translational because necessarily accompanied by equal rocking of the levers back to their initial position. Motion about the V- and L-axes of the ivory is precluded by guide sleeves 185 and 186.

If desired, roller contacts can be supplied at the lever-to-socket contacts, as well as at analogous contacts in other embodiments of the invention, though it is presently preferred to dispense with them.

In Fig. 28 down pressure anywhere along the ivory 187 imparts only translational drop to it, by reason of the pivot and tie pin 188 which passes through rigid supporting levers 189 and 190 and is itself carried by hub-like member 191, Only rocking movement, with the pin 188 as the pivot, is thus permitted the levers, except that slip is allowed at two or more of the contacts 192, 193, 194 and 195 (e. g. at all four if it is desired to limit the movement of pin 188 to a precisely vertical course). Eyes 196, 197, 198 and 199 insure against further components of motion on the part of the levers.

Apertures in the levers such as at 200 and 201 cooperate with vertical guide pins such as 202 and 203 which depend from the ivory and reciprocate through sleeve guides such as 204 in key bottom 205 to preclude motion about the V- and L-axes of the ivory; and down motion is stopped by impingement of skirt 206 of down stem 207 (which is rigidly united with part 191) on floor 208 of sound trap 209, while up motion (imparted by load 210) is stopped by seating of skirt 206 on shoulder 211 of 209.

Figs. 29-36 depict schematically the skeletons of illustrative forms of equalizers varying in diverse ways from those above described, yet nevertheless embodying their basic principles. In view of the exposition of those principles elsewhere herein these figures will be treated summarily.

Fig. 29 shows down guide stems 212 and 213, for preventing motion about V- and L-axes, plus optional locating of long stem 214 (analogous to 10 of Fig. 6) at a mid-point along the handle 215 rather than as shown in Fig. 6. In certain situations this may represent a desirable design, although having the long stem and the load so located that the finger pressure will always be between them affords a substantial increase in the amount of free space (e. g. for a player's knees) underneath the handle or ivory, besides contributing to achievement of a minimum of binding component with a given effective length of stem.

Fig. 30 depicts nesting of double-shanked equalizers for successive sequences of keys, handles 216 becoming progressively shorter to permit shanks 217 to clear each other without being canted, and terminal portions of anchors 218 (permitted to slip as in the case of anchors 147 of Fig. 22, unless the shanks are of sufficient length, say about four inches or more, to obviate need for it) each terminating short of the front-to-rear mid-area of the manual. Start of a first series is indicated by one of the 216 arrows, and start of a second series by the other. Up-stemming at handles and down-stemming at anchors, for purposes of clearance, is understood.

Fig. 31 shows the placing of the handle 219 of one single-shanked equalizer inside the hollow handle 220 of another, rotative freeness in the fit being provided for. The upper arrow represents finger pressure and the lower arrow a preferred location for the load.

Fig. 32 shows the use, with one equalizer whose handle 221 carries the narrow rear part of an unsymmetrical ivory 222, of a second equalizer whose handle 223 supports the lateral enlargement of the ivory at its front portion 224. Lines 225 and 226 signify individual axes of fingers or fins of two sets which interdigitate with each other, all of each being disposed flush with the underside of the ivory in its up position and arcing away from it as handles 221 and 223 respectively carrying them rotate downwardly about their respective anchors 227 and 228 during reciprocation of the ivory. Rotative freeness at the handle-to-ivory contacts is implied, as well as use of the shifting pivot contact principle in the manner shown in Fig. 22, at anchors 227 and 228, and/or use of the sort of slip exemplified in Fig. 5, at the handle-to-ivory contacts.

Fig. 33 exemplifies optional use, e. g. for small, light action keys, of spur gears or pinions 229 intermeshing with racks 230 (the parts advantageously being stamped from plastic) for carrying the front portion 231 of an unsymmetrical ivory, the rear portion being carried by an equalizer 232 having a short handle 232-a, and the shifting pivot contact principle of the invention being exemplified in the contacting between the pinion teeth and the rack teeth.

Fig. 34 shows a front equalizer 233 whose handle 233-a may lie slightly to the right of the axis of the wide front portion of an unsymmetrical ivory 234, and a rear equalizer 235 whose handle 236 lies approximately co-axial with, if not slightly to the left of, the narrow rear portion thereof; the load advantageously being located at 237. In this embodiment a top 238 to cover a series of equalizer cranks such as 233 may conveniently serve as a shelf, table, elbow rest, or other such accessory, and/or can be varied to provide such an accessory, similarly placed, for use with conventional instruments.

Fig. 35 depicts an equalizer particularly suited to use with white ivories of an upper manual that projects over a lower one. There are two shanks 239 and 240 joined to a common anchor 241 and a common handle 242, the front of the latter being the only part that extends into the portion of the ivory (understood) which projects over the lower manual, and the location of the load (not shown) advantageously being as far forward as conveniently feasible.

Fig. 36 shows an equalizer whose shank 243 is itself a lever of the first kind which rocks about anchor 244 to lift a prolong 245 or the like, at its rear. The anchor may be permitted to slip, similarly to anchors 147 of Fig. 22, or the shank may be sufficiently long to render such slip needless, if not as well to render rotative freeness at handle 246 likewise needless. Optionally another lever of the first kind 247 may be disposed under the ivory 248 analogously to levers 14 of Fig. 6 and 97 of Fig. 15, so as to operate a different prolong 249. In this manner each ivory may thus be lever-connected with two or more prolongs or analogous elements, each operating a different tone-producer actuation means, so as, e. g., to play octaves, chords or etc. by depression of only a single ivory, and without resort to mechanical structure overlying any portion of the manual. (If applied to a full keyboard this would of course place ends of two or more levers, one overlapping the other, in operative relationship under each prolong, but without need for adversely affecting the working of either.)

It will be noted that in case of a succession of Fig. 36 keys the shanks 243 of each will underlie the ivories 248 of neighboring ones.

In Figs. 37-38, which respectively are plan and end view diagrams of a manual which, but for the relative shortness of its ivories, corresponds to the conventional 5-octave (61 note) pipe organ manual, the ivories of the lower half (plus middle g flat) of the manual 250 are carried by "handles" 251 of a first set of "cranks" 252, all of equal length and in parallel, substantially horizontal sequence, with the far end of each crank anchored securely against torsion, at small elbow 253 (which passes through vertical support wall 254)—e. g. by a common nip or clamp member 255 bearing down tightly on each elbow to hold it fixedly against bed 256.

Likewise as to a second set of reversely disposed cranks 257, with handles 258 and anchors 259 for the ivories of the upper half of the manual; crank to crank horizontal clearance being insured by suitable selection of shank cross-sectional size and cant (i. e. slant or obliquity) and, alternating with the shanks, ridges (not shown but analogous to ridges 286 of Fig. 40 below) in horizontal partitions 260; which partitions serve as motion limiting ceiling and bottom for the cranks. Crank to crank vertical clearance (allowing e. g. for a standard key drop of ⅜ inch against resistance of return springs 261 placed under the fronts of the keys) is achieved by similarly disposing the second set in a horizontal tier say ½ inch or so below that of the first set.

The vertical dimensions of the portions 262 of the keys immediately to the rear of the ivory proper (i. e. beneath stop rail 263) are made sufficiently large (analogously to those in Fig. 39 below) to accommodate the handles at the level of either of the two tiers, i. e. at levels say about ½ inch apart. Advantageously also the shank-elbow-handle connection is such that in undepressed key position the elbow is 1/16 inch (half the ivory drop distance) above the level of the anchor, and in depressed key positions 1/16 inch below it, as depicted by dash lines in Fig. 38.

Since the drawing of Fig. 37 as filed is about ½ scale (cf. width of its keys) it will be apparent that having its approximately 12 inch-long cranks canted so as to occupy no more than about 2½ inches horizontally at the rear of the manual permits them a thickness nevertheless of about ⅓ inch. This has been found ample in the case of (to mention a material commonly available at hardware stores) round coppered Bessemer steel rod for satisfactory key action in operating a switch against the resistance of a medium key return force. With substantial increase in such force (i. e. load) however, a more deformation-resistance grade of steel or other metal or material may be preferable, as well as an increased vertical dimension and/or a sharper cant for the cranks, to permit increase in their horizontal cross section (their vertical thickness being relatively unlimited in any case). Or, particularly if a crank length of say 15 to 18 or more inches is desired, more than two tiers of cranks may be used, thus permitting greater crank thickness by enlarging the crank to crank spacing in individual tiers.

The use of the last mentioned expedient where the load is not a spring but a conventional upright or grand piano hammer action (resulting in marked economy of front to rear console dimension along with a number of key action advances, including e. g. elimination of the large disparity between the ivory drop at the rear and that at the front of the conventional piano or organ ivory, and avoiding need for the lateral looseness of such ivories) is illustrated in Figs. 39–41.

In Fig. 39, which is an end view of a full-sized 88-note keyboard using 7 tiers of the crank-type keys with an independent key lever operatively underlying each, to transmit its motion to a hammer action, 4 of said tiers may be thought of as having 13 cranks each and 3 as having 12 each, making 88 in all. The drawing of Fig. 39, as filed, is approximately $$\frac{16}{21}$$

scale. In it, white keys 264 and black keys 265 are each supported in their raised position by one of a bench of 88 key levers 266 which are mounted on fulcrums 267 and at their rear ends rest on base member 268 due to the weight of a hammer action (understood) transmitted through prolong 269 acting on capstan 270. While said prolong could be that of a large-sized upright piano action, or could be replaced by the wippen of a grand piano action, it is here shown as serving the function of "the upper side of the back or inner end of the key 1" of Nylund Re. Pat. No. 20,382 (cf. page 1, column 1 thereof), by bearing upward through its felt pad 271 against rounded projection 272 of lever of the third kind 273 to actuate rod 274 corresponding to Nylund's "pull rod or wire 14." Details of the pertinent mechanical environment are provided in the patent (cf. the text relating to its "lever 11," "rounded projection 11a" and "felt pad 12," as well as that describing the hammer action operated by reciprocation of its said "pull rod or wire 14").

The portions of keys 264 and 265 immediately to the rear of stop rail 275 and front panel 276 have vertically disposed extensions 277 for receiving handles 278 of cranks 279 which are securely fulcrumed in vertical wall 279a.

Vertical openings (understood) in the parts are provided (between successive crank handles 278) to permit reciprocation therethrough of rods 274.

The dash line positions of the shanks of cranks 279 may be considered as representing them in a position intermediate the top and bottom of their reciprocation. At the lowest point thereof they may contact, and their further motion be limited by, the crank bottoms 280 (each of the latter also serving as a crank ceiling for the next tier below and if desired having depending guide ridges or fins (not shown) to complement or serve the purpose of ridges 286 of Fig. 40, below).

Recess 281 for housing a conventional guide pin 282 rising from base member 268 (which also serves to limit down motion of each end of lever 266 as well as to support its fulcrum, etc.) is shown as extending not only through lever 266 but also into the key, thus functioning to keep the lever lined up properly, under and with respect to the key.

Advantageously lever 266 may have an I-beam type of cross section.

The action of lever 266 is identical with that of the usual piano key lever, except that 266 is not finger-contacted. It therefore not being necessary for it to serve the function of providing approximate uniformity of ivory drop, its length may, if desired, be made much less than that of usual piano key levers, and the weighting of the parts and action adjusted accordingly in conventional ways. In such case levers 266 in Fig. 39 may be thought of as all being disposed in a single tier, each running approximately straight back, with its axis in substantially the same vertical plane as that of the ivory directly above it.

Or, if lengths of one to two feet or so, roughly corresponding to usual extremes in upright and grand piano key lever lengths, be desired, canting of levers 266 as shown in Fig. 40 below may be used.

Conventional expedients are available to minimize frictional wear at the scraping contact between the top of capstan 270 and prolong 269 or other member corresponding thereto. Or, as presently preferred, one or both of the contacting surfaces may be made of nylon (cf. U. S. P. 2,246,086).

Likewise, the scraping or sliding contacts at loci 283, between keys 264 or 265 and levers 266 may be made of nylon. Here, however, the scraping motion may arise not only from a rear to front arc component in the motion of 266, but where 266 is canted, from a slight component longitudinally of the manual. Because of the latter component it may be desired to erect vertically disposed slippery surfaced guides such as fins 284 immediately adjacent the side of the key, e. g. jutting from front rail 285, to prevent any drag whatever on the bottom of the key at locus 283, in the direction of the cant.

Such canting is depicted in Fig. 40. Its drawing, as filed, is an approximately ⅓ scale plan view of the first four of a total of 13 keys having usual ivory lengths of 5¾ inches for the white and 3⅛ inches for the black, and constituting one of the tiers of a 7-tier embodiment generally analogous to that of Fig. 39.

The numbers and functions of the parts in Fig. 40 correspond generally to those in Fig. 39. Thus, down pressure on keys 264 or 265 is imparted to levers 266 at loci 283, said levers thereupon rocking on their fulcrums 267 to raise prolongs 269. Translational drop is imparted to the keys by reason of the fact that they constitute, or are rigidly affixed to, the handles of cranks 279 whose shanks are securely fulcrumed in vertical wall 279a. Partitions or ridges 286, rising from crank bottom 280 and running parallel to and between the shanks of cranks 279, insure parallel co-alinement of said shanks.

If it be desired to cant levers 266 as in Fig. 40 and yet obviate their extending beyond the ends of the manual, the principle of reverse tiering can readily be applied, as depicted in Fig. 41.

In Fig. 41, wherein numbers and functions of parts correspond generally to those in Figs. 39–40, downward projections of one series of keys 264, 265 bear on an upper series of levers 266 which are canted in one direction, while longer downward projections of a second series of said keys bear on a lower series of said levers; said two series of levers being reversely canted and disposed at such respective levels that they clear each other at all times during use.

It may be noted that a sufficiently tight fit of the anchor portion of a crank in its fulcrum (e. g. of anchor portion 79 in sleeve 80 in Fig. 14) will prevent rotation of said portion in use. In such case depression of the handle portion of the crank (e. g. of ivory 73 in Fig. 14) can occur only via bending of the shank (e. g. 77 in Fig. 14).

In this respect there thus are two varieties of crank actions to be considered: (1) those using and (2) those not using rotational anchor portions. For short, these may be referred to as (1) rotational, and (2) bending. The choice between them or mixtures of them is applicable in all crank-using embodiments of the invention, although the two will obviously not be full equivalents of each other in every situation, or for all purposes.

With either one, however, it is generally advisable to place the load (i. e. key return force) under the front end of the handle (i. e. ivory) where the shank to handle elbow is rearward thereof, so as to minimize torsion of the shank between its anchor and said elbow during use.

Sturdiness of the cranks can be controlled by increase of horizontal thickness (via increase of cant), increase of vertical thickness, selection of material having optimum capacity for absorbing "inner work" (cf. U. S. P. 2,150,377) when subjected to deformation, and choice of optimum cross sectional contour in accordance with known laws of applied mechanics and machine design. In this connection, it is understood that a hollow, circular cross section provides optimum torsion resisting efficiency in the use of any material, while a rectangular one is apt to undergo warping at the sides when twisted to a marked extent; so that if a rectangular or oblong cross section is used, it will be advantageous to give it rounded edges.

In Fig. 42–49, about to be described, are shown illustrative forms of novel means for serving the same purpose as the novel deformation-resisting crank-like keys of the invention; said means differing from the latter, however, in capitalizing substantially solely on the bending-resistant (rather than mainly on the torsion-resistant) properties of rigid cane-shaped structures (made, e. g., of spring steel) generally corresponding to the ivory 9 plus stem 10 structure of Fig. 6.

Figure 42:
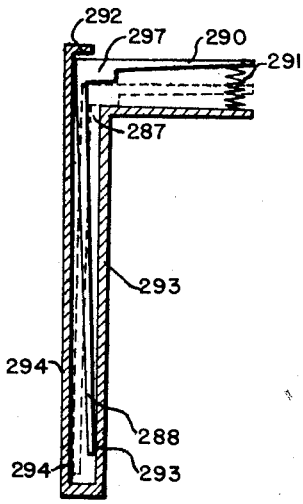

Said Figs. 42–49 may be collectively referred to as all embodying one or more vertical guide sleeves 287 for confining reciprocation within them of vertical stem portions 288 of horizontal ivory 289 (Figs. 43, 45 and 49) supporting members (integral with said stem portions) 290 (Figs. 42, 44, and 46–48). Upward ivory motion under influence of key return means (e. g. weight of piano hammer action or, as indicated in Figs. 42 and 44–48, spring 291) is limited by suitable horizontal surfaces as at 292 in Figs. 42, 44 and 46–48, so that in undepressed position the ivories and the vertical stems are maintained as indicated by solid lines in e. g. Figs. 42, 44, and 46–48. Finger pressure on the ivory directly above the spring (i. e. the load) causes it to drop, however, and carry the stem downward along with it. In Fig. 42 e. g. (where the ivory initially was higher at its front than at its rear) this appears to result in a tendency toward shift of the ivory-stem structure to the position shown by dash lines, with the lower tip of the stem moving from contact with the front wall at 293 to contact with the rear wall at 294 of its guide sleeve 287.

Regardless of the point of finger pressure along the ivory, however, confinement of the tips of the stems between the front and rear walls of their sleeves, plus the rigidity of the elbow joints, insures substantial longitudinal uniformity of ivory drop. And the confining effect of the ridges constituting the side walls of the sleeves 287 insures similar uniformity laterally of the ivory.

Figure 48:
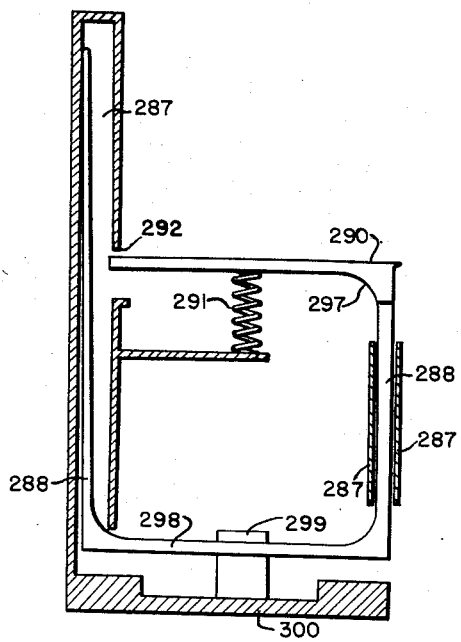
Figure 49:
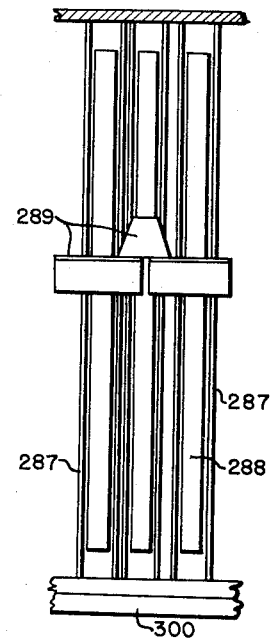

Advantageously the stem is longer than the ivory, preferably 1½ to 2 or more times its length; but as in the case of Figs. 48 and 49 (the latter being a front view, with ivories added, of the former) part of the stem length may be upward and part downward, with respect to the ivory level. Or, long stems conveniently can be used without substantial change of external appearance of instruments such as conventional upright pianos by disposing the bottom panel vertically under the stems and splitting it (so to speak) at least part way down into two thin parallel walls which, with appropriately spaced vertical ridges on the inner faces, provide the four walls of each individual stem guide sleeve.

Figure 43:
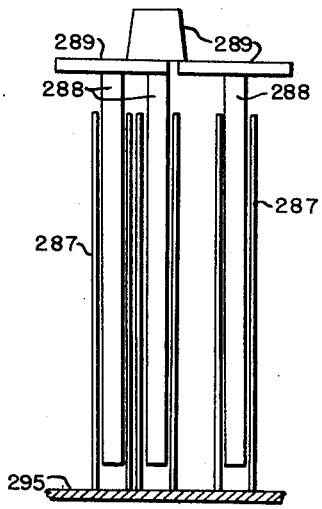
Figure 44:
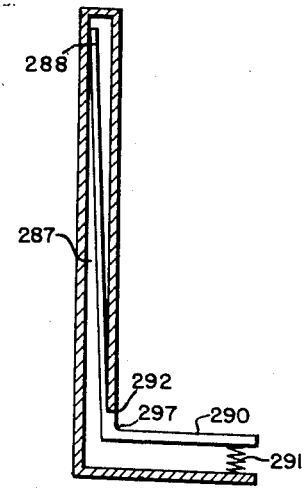
Figure 45:
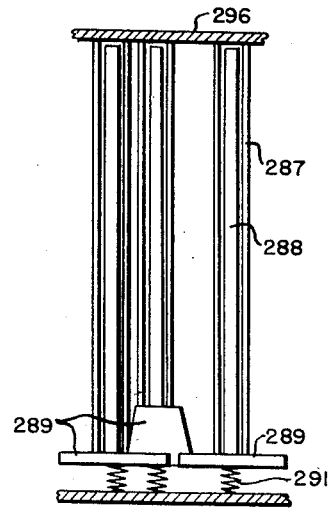

It will be seen from Fig. 43 and Fig. 45 (respective front views, but with ivories added, of Figs. 42 and 44) that sleeve bottom (295 in Fig. 43) or top (296 in Fig. 45) may serve or co-operate as stops for the stems.

Figure 46:
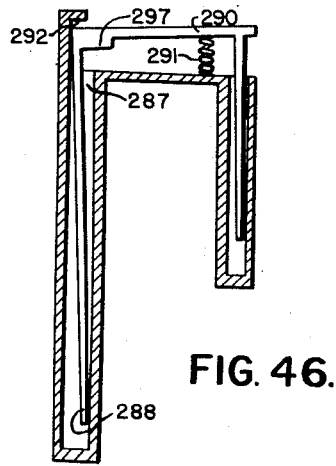

The extra thicknesses at points 297 in Figs. 42, 44 and 46–48 are intended to signify optional rigidity reinforcement, together, in the case of Figs. 42, 44 and 46, with a contour providing suitable surface portions (not numbered) to seat against stop surfaces 292.

Figure 47:
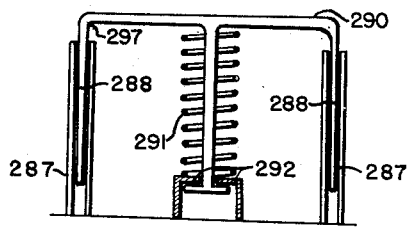

Figs. 46-48 exemplify the expedient of having a vertical stem and sleeve guide at each end of the ivory. As these stems approach equality in length it is advisable to shift the load toward the midpoint of the ivory length, and this remains true in Fig. 48, where the stems are integrally interconnected, but only through lower horizontal portion 298.

Part 299 in Fig. 48 is a wicket-like member rising from base 300, to serve as an upper stop for said lower horizontal portion 298.

Smooth, anti-friction surfacing, e. g. of nylon, of the inner walls of the sleeves where contacted by the tips of the stems is advantageous; as likewise is a rounded contour and slippery surface at the top of the stem (which itself may consist wholly of nylon). But the friction force in any case is almost infinitesimal since, as in the crank-type embodiments, the force of any violent down motion of the ivory is absorbed by the key bottom or stop structures.

Long life factors, however, make it pertinent to consider ways of distributing areas of stresses, strains and moving contacts over as many parts and surfaces as practicable.

A illustrated by aperture 40 in Fig. 6, spaces or openings are provided in the vertical guide sleeves for auxiliary levers to extend through, in case such levers (e. g. like 14 of said figure) are used.

In selecting materials for the key and appurtenant parts those with low coefficients of thermal and absorption expansion are to be preferred, as well as those with low specific gravity (save where special distributing of weight is desired). Nylon, particularly when fortified with anti-oxidants (cf. U. S. Pat. 2,278,350) may be used to advantage; also ethyl cellulose and certain other plastics (cf. Modern Plastics, issue of September 1948, pages 150-153; also U. S. Pat. 1,650,095).

For the equalizer units metals with high strength-to-weight ratio, such as stainless spring steel, titanium (non-ductile form), Alcoa alloy S75 (e. g. faced with stainless steel—cf. U. S. Pat. 2,170,040), etc., may be used. To metals subject to sweating or corrosion, appropriate coatings, e. g. of nylon, polythene or Teflon, can be applied. Or the entire skeleton of the equalizer and/or the entire ivory can be fashioned of nylon (cf. U. S. Pat. 2,309,729); as in fact can all lever and bearing parts as well.

If the novel shortening of front-to-rear dimension of a keyboard instrument as a whole, made possible by the invention, introduces a problem of stability, it can be solved by providing means for anchoring the instrument to adjacent wall or floor structure and/or by appropriately weighting it, e. g. with lead, on the principle of ballast. In fact the ballast principle can be invoked to achieve optimum performance of equalizer, ivory and ivory guide parts generally, as e. g. by concentrating at the lower end the weight of stem 10 (Fig. 6) or of the guide stems for counteracting tilt about the L-axis (though for a given weight distribution, and with other factors constant, the component of binding becomes very low as the ratio of the length of the latter stems to the ivory width increases beyond about 1½ or 2). Thus rear guide 82 in Fig. 15 advantageously can be weighted near its base, or optionally replaced with a guide stem depending from the ivory through space provided between or to the rear of equalizer parts, e. g. after the fashion of guide stems 149 in Fig. 23.

Similarly, weighting of ivory, lever, handle and/or other moving parts can be utilized, in accordance with conventional practice, to achieve desired action characteristics. Or concentrating of a handle weight at its rear end can be effected by a bracket-like web which serves also to impart special strength to the elbow formed by a handle with the shank of a crank-like equalizer or with a stem such as 10. In the latter case a slit can be made in the top of the front portion of the guide 11 (Fig. 6) to accommodate reciprocation of such a web in a vertical plane.

In specifying hereinabove that stem 10 in Fig. 6 advantageously is longer than the ivory, preferably 1½ to 2 or more times its length, and that guide stems for counteracting tilt about the L-axis incur a very low component of binding when their length is more than about 1½ to 2 times the width of the ivory, it of course is the effective length which is meant, i. e. the length between upper and lower rub points in the respective guide sleeve. In Fig. 6 this is exemplified by the distance between the uppermost portion of guide 11 and the rub area 34a in its lowermost portion.

All impinging or impinged-upon parts advantageously can be provided with wear-resistant facings (e. g. coatings, or replaceable laminae or inlays secured in place as by adhesives). Cf. U. S. Pat. 2,335,930 for application of a highly abrasion-resistant coating of nylon to metal; U. S. Pat. 2,406,039 for a highly scratch-resistant coating of steel with polythene; and U. S. Pat. 2,471,500 for an extremely adherent coating for aluminium metal comprising a particular polyamide-halide interpolymer, such coating being adapted to withstand extreme vibration such as of airplane parts, etc.

If desired, the process of U. S. Pat. 2,330,635 can be applied to metal guide faces (e. g. of self-lubricating metals) to give them optimum performance characteristics under sliding stress.

When impinged-upon parts call for sound-absorbent properties, portions (particularly non-friction ones) of their facings advantageously can be made porous (cf. U. S. Pat. 1,937,889 and U. S. Pat. 2,009,059).

The exact sort of sound-absorbent medium for use in impinged-upon parts or in the sound traps or other action stop members of the invention is largely a matter of choice. E. g., selection can be made of one or more materials or media such as described (along with discussions of principles involved) in U. S. Pat. 1,583,263 ("noiseless" typewriter platen; though its soft rubber layers should contain ample anti-oxidants to insure long life); U. S. Pat. 2,009,059 (sound-deadening pads for railway rolling stock); U. S. Pat. 2,308,869 (sound absorbing wall); U. S. Pat. 2,372,587 (sound trap for use in a fluid line); and U. S. Pat. 2,448,332 (firearms silencer); and/or use can be made of conventional felt materials or of such compositions as the polyamide-cork particles pressed sheeting (it being given a wear-resistant outer lamina of nylon) identified in U. S. Pat. 2,365,508 as a good vibration dampener.

In any case the sound-absorbent medium should be relatively immune to atmospheric conditions or variations, relatively non-compacting and non-condensing over long periods of use, and confined against change in shape or dimension.

Difficulties with prior art felts as sound deadeners include wearing out, swelling with moisture (conducive to sticking of keys), shrinking on drying out (conducive to rattle), compacting or condensing in use (also conducive to rattle), vulnerability to attack from insects or the like, and deterioration from miscellaneous other causes. Consequently it is an object of the invention to provide a wear-resistant, moisture-excluding facing over the felt or other material, as well, advantageously, as a sound trap housing for it, and to make these innovations available as accessories for existing instruments. E. g., the part of an ordinary piano or organ console or casing immediately overlying the rear of the manual may be modified by affixing nylon-surfaced sound-deadening cushioning to its underside, in replacement of the conventional felt; or parts such as 29 (Fig. 6), e. g. inverted, can be installed at the rears of the ivories and a manual-long housing member containing sound traps complementary thereto provided just above the rear of the manual.

These expedients are particularly appropriate for spring-returned key actions of old organs where noisiness during playing of soft music is especially obnoxious; likewise for up-motion stop means in the case of noisy pedal actions.

The rearward slope of the ivory top shown in Figs. 6 and 15 can be omitted or varied within any useful range, say from an angle of 5 degrees downward to (in the case of upper manuals of large organs) 5 degrees upward.

If for any reason it should be desired to retain the present usual disparity between ivory front and rear drop, this can readily be done within the invention by limiting the respective drop distances at front and rear accordingly, while permitting slight bending of the Fig. 6 type of handle or slight torsion of the Fig. 14 or 31 type of shank, e. g., to allow for it.

The ivory-driven rigid part, and the guide means for it which, via the subject shifting pivot contact principle, converts its motion into equalized or controlled down motion of the ivory's L-axis, may, either one but not both, be separate from the ivory or in rigid union with it. E. g., in Figs. 6, 14, and 26-27 the rigid parts (cf. 16; 77, 79; and 175-a) are rigidly connected to the ivory while the guides (11; 78, 80; and 176 etc.) are entirely separate from it; in Figs. 15 and 23 the rigid parts of the equalizers (86 etc.; and 189, 190) are connected with it only by pressure; while in Fig. 28, e. g., the shifting pivot contact may occur in part at least on an under surface of the ivory proper (as also will be the case whenever more or less of the requisite factor slip is provided for in the way exemplified in Fig. 5).

Reversal-of-parts variations, such as making vertical guide stems stationary and letting their sleeves reciprocate with the ivory, are optional but not presently preferred.

Security of alinement of ivories and their levers can be aided in various ways, e. g. by having their opposed surfaces complementarily concave and convex, and/or by hinging them together and permitting slight front-to-rear play for the lever at its fulcrum to allow for the resulting arcing factor.

When using equalizers of the Fig. 15 type the shanks may e. g. run to the right in the treble half of the manual and to the left in the bass half; if desired with the last few keys at each end of the Fig. 6 type, to obviate extending of any equalizer structure beyond the manual ends.

Illustrative forms of hammer action actuators other than that of U. S. Pat. 2,338,992 above cited, with which the levers of the invention may readily be disposed in operative engagement, may be found in Re. Pat. No. 20,382 (cf. part 14); Re. Pat. No. 22,247 (cf. parts 27, 28 and 29); and Re. Pat. No. 22,777 (cf. parts 28, 31 and 30).

So far as applicant is aware, the principle of the sliding canes (Figs. 42-49) is of novel applicability in fields outside that of musical instruments. For instance, if a wall structure of a house or sleeping car were provided with an elongate narrow vertical space between its front and rear portions and given ridges to constitute a vertical guide sleeve for a thin, rigid stem, strip or sheet, part 288 of Fig. 42 could be thought of as representing the latter and part 287 the sleeve. Part 290 then (assuming it exactly horizontal) would represent, say (in end view), a platform or bed board for supporting a mattress when in use, and spring 291 a resilient support analogous to that provided by bed springs. When not in use the board could, via incidental adaptations in design, be raised or folded to a position flush with the wall or ceiling of the room (stop 292 in Fig. 42 being made adjustable to permit this), and spring 291 with its supporting structure made similarly adjustable to fold back flush against the wall. Thus interpreted, Fig. 42 may be regarded as diagrammatically depicting a bed structure incorporating the utility of a bed board, having a uniform depression irrespective of the user's position on it, obviating the lateral sway factor characteristic of some bed springs, and occupying a minimum of room space even when in use.

Similarly, the sleeve could be in-built in the wall of a swimming pool, and the board be one of a number of short individual diving boards along its edge; or, equipped with dial and pointer, the board could function as scales.

The rigid stem, in the case of the bed structure embodiment e. g., optionally could extend upwardly as well as downwardly; and the same applies to possible use of the Fig. 47 variation for a settee, or of the Fig. 42 type for a built-in seat along the wall of a room.

In the case of such adaptations the length of the edge portion from along which guide strip or sheet 288 depends will exceed the width of the ivory supporting member 290 (which will then be a "platform," "bed board" or etc.) and consequently will also exceed the fraction of said width which is represented by the distance from said edge portion to the locus of the resilient support provided by spring 291.

Or, the body-support part and the drop equalizer part of such an adaptation can be regarded as respectively signified by ivory 9 and stem 10 (plus its guide sleeve 11) of Fig. 6.

In any case, the inner surfaces of the sleeves advantageously will be of sound proof or sound deadening material (e. g. hard rubber) or nature, and they and the stem tips comprise anti-friction means, e. g. self-lubricating metal composition or nylon surfacing and/or noiseless rollers affixed, say, to the stem tips (the latter being regarded as pivot-contacting points—the pivots being the points on the sleeve walls which happen to be contacted by said tips at any particular instant during reciprocation).

Novel subject matter disclosed but not claimed herein or in parent application S. N. 59,512, filed November 12, 1948, is being claimed in continuational applications S. N. 206,100, filed January 15, 1951, and S. N. 307,099, filed August 29, 1953.

It will be apparent that many minor changes in the physical embodiments of the invention and its novel aspects may be made within the scope of the appended claims without departing from the spirit of the invention.

I claim:

1. An article of manufacture comprising a member of rigid, deformation-resistant material having an approximately right-angled elbow dividing it into an object supporting "handle" portion and a vertical "stem" portion, down motion of the handle portion being opposed by means resiliently supporting it at a point located substantially farther from the elbow in one direction along the handle portion than is the opposite end of the handle portion, and substantially axial motion of the stem portion being guided by a sleeve having surfaces adapted for anti-friction contacting with, respectively, a lower and an upper part of the stem portion during the latter's motion, the motion of the handle portion also being positively limited by stop structure occupying a locus in proximity to the vertical plane that includes the axis of said stem portion and said point, such locus being approximately at least as distant from said axis as is said point, whereby down force exerted on the handle portion at any place between the elbow and said point results in substantially uniform drop of all areas of the handle portion; said handle portion comprising an object supporting upper surface at least part of which is equidistant between said point and said axis.

2. An article of furniture such as beds, seats, springboards, scales, and the like, comprising a horizontal support platform, at least one rigid elongate member vertically and rigidly extending from it at a locus approximately adjacent an edge portion, resilient means supporting the platform at a locus removed from said first locus along a line perpendicular to said edge portion, the length of said edge portion being greater than the portion of said line extending between said first mentioned locus and said second mentioned locus, rigid vertical sleeve guide means for confining translational reciprocation of said member to an approximately vertical path, anti-friction surfaces at points of contacting between the member and the guide means, and stop means limiting the downward extent of such reciprocation; whereby application of downward force to the platform imparts to it approximately vertical downward motion of substantially uniform extent, irrespective of where, along said portion of said line, the force is applied.

3. An article of manufacture for yieldingly sustaining an object, said article comprising a rigid support member for receiving the object, means disposed to resiliently oppose down motion of said member at least principally by contacting it along a frontward area, and at least one deformation resistant equalizer system comprising a rigid part forming an elbow with said member, said elbow being rigid against flexure relative to any horizontal axis perpendicular to the vertical plane comprising the front to rear axis of said member, and said rigid part being disposed for motion responsive to down motion of said member, having a pivot contacting surface substantially distant from said elbow along a shank disposed at an angle of less than about 120° relative to said axis, and being provided with pivot supplying guide means for limiting to a particular path the movement of said pivot contacting surface caused by said down motion, said guide means acting, through deformation resistance of said system, to convert the movement thus limited into substantially translational down motion of said member; each such elbow of each such equalizer system being located rearwardly of said frontward area.

4. The article of manufacture of claim 3 wherein such an elbow is disposed in a substantially horizontal plane and such rigid part and such rigid support member, interconnected by it, respectively correspond in action to the shank and the handle of a crank.

5. The article of manufacture of claim 3 wherein such an elbow is disposed in a substantially vertical plane and such a path is along a substantially vertical course.

6. The article of manufacture of claim 3 which comprises means for positively limiting down motion of said support member by contacting it along an area situated substantially as far frontward, at least, as its said first mentioned area.

7. The article of manufacture of claim 4 in which the upper surface of said support member is capped by a keyboard musical instrument key "ivory" and said first mentioned means is the key return agency therefor.

8. The article of manufacture of claim 5 in which the upper surface of said support member is capped by a keyboard musical instrument key "ivory" and said first mentioned means is the key return agency therefor.

9. The article of manufacture of claim 5 wherein said guide means comprises a motion limiting structure having a relatively thick inner layer of sound-deadening medium and a relatively thin outer layer of wear-resistant medium.

10. The article of manufacture of claim 5 which comprises rotating anti-friction bearing means at said pivot contacting surface.

11. An article of manufacture comprising a pair of the articles of manufacture of claim 5 fashioned as a unitary composite one with said support members of each integrated into a single such member, the same having at least two equalizer systems such as aforesaid, with resilient means disposed to yieldingly oppose its down motion by contacting it at a point between them; the pivot contacting surface on at least one of the shanks forming such elbows being located substantially below the level of such point.

12. The article of manufacture of claim 5 in which said rigid part extends vertically downward from said elbow.

13. The article of manufacture of claim 5 in which said rigid part extends vertically upward from said elbow.

14. The article of manufacture of claim 6 wherein said first mentioned means comprises a spring.

15. The article of manufacture of claim 6 wherein said first mentioned means comprises a lever.

16. An article of manufacture comprising a pair of the articles of manufacture of claim 7 fashioned as a unitary composite one with said support members of each integrated into a single such ivory-capped member, the same having at least two equalizer systems such as defined by claim 4 and resilient support means to yieldingly oppose its down motion.

17. The article of manufacture of claim 7 wherein said first mentioned means comprises a spring.

18. The article of manufacture of claim 7 wherein said first mentioned means comprises a lever.

19. The article of manufacture of claim 9 in which said wear-resistant medium comprises nylon.

20. The article of manufacture of claim 11 which is an article of body supporting furniture in which at least one of said rigid parts extends both upwardly and downwardly from its said elbow.

21. The article of manufacture of claim 1 in which the length of said stem portion is at least 1½ times that of the distance separating said first mentioned point and said elbow.

22. The article of manufacture of claim 21 in which said means resiliently supporting said handle portion is disposed beneath the level of said handle portion.

23. The article of manufacture of claim 2 wherein the distance between said anti-friction surfaces is at least 1½ times the distance separating said first mentioned locus and said second mentioned locus.

24. The article of manufacture of claim 23 in which said resilient means is disposed beneath the level of said support platform.

25. The article of manufacture of claim 3 in which said first mentioned means is disposed beneath the level of said support member.

26. The article of manufacture of claim 5 in which said rigid part forming said elbow is at least 1½ times as long as the distance separating said forward area and said elbow.

27. The article of manufacture of claim 26 in which said rigid support member is capped by a keyboard musical instrument key "ivory" and said first mentioned means is the key return agency therefor.

References Cited in the file of this patent

UNITED STATES PATENTS

| Number | Name | Date |
|---|---|---|
| 367,955 | Braun | Aug. 9, 1887 |
| 669,729 | Hedgeland | May 12, 1901 |
| 1,657,169 | Mayhew | Jan. 24, 1928 |
| 1,775,865 | Poeltl | Sept. 16, 1930 |
| 1,813,751 | Malcolm | July 7, 1931 |
| 2,243,834 | Bonilla | June 3, 1941 |
| 2,246,086 | Austin | June 17, 1941 |
| 2,253,782 | Hammond et al. | Aug. 26, 1941 |
| 2,472,740 | Barnett | June 7, 1949 |